Patented Sept. 13, 1938

2,129,907

UNITED STATES PATENT OFFICE 2,129,907

META-SUBSTITUTED PHENOLS

Edgar C. Britton, Midland, Mich., assignor to The Dow Chemical Company, Midland, Mich., a corporation of Michigan No Drawing. Application March 22, 1937, Serial No. 132,301

8 Claims. (Cl. 260—629)

This invention relates to a method for preparing meta-substituted phenols by the vapor-phase hydrolysis of halogenated aromatic hydrocarbons.

According to the prior art on the subject, the vapor-phase hydrolysis of a nuclear halogenated aromatic hydrocarbon results in the formation of the corresponding phenol as the only phenolic product. For instance, Lloyd and Kennedy, U. S. Patent No. 1,849,844, have reported that pyrogallic acid, i. e. 1,2,3-trihydroxybenzene, is the product obtained when 1,2,3-trichlorobenzene is hydrolized in the vapor phase with steam.

I have now discovered that hydrocarbon-substituted halobenzenes do not react altogether in such manner, but, instead, that they react in vapor-phase with steam to form a product containing a substantial proportion of a substituted phenol in which by rearrangement the hydroxy group is in a position ortho or para to the original position of the halogen, together with a certain amount of the phenol in which the hydroxy group occupies the original halogen position. For instance, when para-ethylbrombenzene is hydrolyzed in the vapor phase with steam, both meta-ethylphenol and para-ethylphenol are formed simultaneously, as represented by the following equations:—

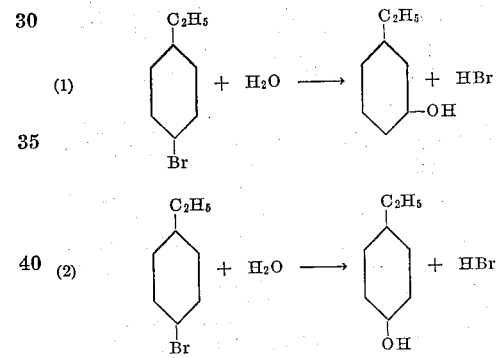

Similarly, when ortho-ethylbrombenzene is hydrolyzed in the vapor phase, a mixture of meta-ethylphenol and ortho-ethylphenol is formed. The isomeric phenolic products from such hydrolysis may be separated from one another and the individual phenols recovered in good yield. The invention accordingly provides a direct method whereby a meta-hydrocarbon-substituted phenol, such as meta-ethylphenol, may be prepared readily and in good yield from the corresponding ortho- or para-hydrocarbon-substituted halohydrocarbons.

The invention, then, consists in the method hereinafter fully described and particularly pointed out in the claims.

In carrying out the hydroylsis according to my method a vapor mixture of a hydrocarbon-substituted halohydrocarbon, e. g., para-chlorotoluene, and a molecular excess of steam is passed through a bed of a suitable hydrolytic catalyst maintained at a temperature between about 400° C. and 650° C., preferably between 425° C. and 600° C. Any of the hydrolytic catalysts usually employed in vapor-phase hydrolysis, e. g. activated clay, silica gel mixed with a small amount of a copper salt, etc., may be used in the process. The vapors issuing from the catalyst chamber contain a mixture of isomeric phenolic compounds, e. g. meta- and para-cresols, together with steam, hydrogen halide and unchanged halohydrocarbon. These vapors are condensed, and the condensate is treated to remove the mixture of isomeric phenols after which the latter may be separated as individual compounds by suitable procedure. For instance, a mixture of isomeric ortho- and meta-hydrocarbon-substituted phenols may be separated into its components by fractional distillation. Meta- and para-hydrocarbon-substituted phenols may be separated from one another by fractional crystallization of the phenols from suitable organic solvents, or of the phenol salts, e. g. alkali or alkaline earth metal salts, from aqueous solutions. A mixture of all three isomers is, of course, separated into its components by a combination of such operations.

While the hydrolysis of hydrocarbon-substituted aromatic halides with steam occurs at temperatures ranging from about 400° C. to above 650° C., at temperatures below 425° C. hydrolysis is slow and at temperatures above 650° C., carbonization occurs to an objectionable extent. The relative proportion of the phenolic isomer in which the hydroxy group is ortho or para to the original position of the halogen with respect to the proportion of phenolic isomer in which the hydroxy group occupies the original halogen position increases as the hydrolysis temperature is raised. For instance, the mixtures of meta- and para-cresols obtained by hydrolyzing para-chlorotoluene in separate experiments at temperatures of 465° C. and 530° C. contained 29 per cent and 35.7 per cent by weight of meta-cresol, respectively.

The following examples illustrate the principle of this invention, but are not to be construed as limiting its scope.

Example 1

A mixture of 107 grams of para-bromtoluene and a molecular excess of water was vaporized and the vapor therefrom was passed in one hour through a catalyst maintained at a temperature of 600° C., said catalyst consisting of 200 c. c. of a granular mixture of one-third by weight pumice and two-thirds silica gel which had been soaked in cuprous chloride solution and then dried. The vapor issuing from the catalyst chamber was condensed and the condensate was treated with an aqueous sodium hydroxide solution, whereby the cresols formed during hydrolysis dissolved and were separated from the insoluble unreacted para-bromtoluene. The alkaline cresol solution was acidified with dilute sulfuric acid, liberating 6.6 grams of mixed cresols as an oily layer. This oil layer was separated, mixed with 8.5 grams of concentrated sulfuric acid, and the mixture was heated at a temperature of 100° C. for three hours to form meta- and para-cresolsulfonic acids. The sulfonated mixture was then heated to a temperature of 119° C. and steam was passed in, whereby the meta-cresolsulfonic acid was decomposed and meta-cresol steam-distilled from the mixture. The condensate was redistilled and 3.9 grams of meta-cresol recovered. The steam distillation of the sulfonated mixture was continued at a temperature of 130° C., whereby the para-cresolsulfonic acid therein was decomposed and 1.6 grams of para-cresol recovered.

Example 2

A mixture of 36.7 grams of para-chlortoluene and 41.2 grams of water was vaporized and the vapor mixture was passed in one hour through a catalyst maintained at 465° C., said catalyst consisting of about 200 c. c. of granular silica gel which had been soaked in aluminum chloride solution and dried. The vapors leaving the catalyst chamber were condensed and the condensate was treated as in Example 1. 1.4 grams of meta-cresol and 3.4 grams of para-cresol were obtained.

Example 3

Using 50.1 grams of para-chlortoluene and 65.1 grams of water, the procedure of Example 1 was followed except that the catalyst was maintained at a temperature of 530° C. 5.2 grams of mixed cresols consisting of 35.7 per cent by weight of meta-cresol and 64.3 per cent of para-cresol was obtained.

Example 4

A mixture of 23.2 grams of ortho-chlordiphenyl and 104.2 grams of water was vaporized and the vapor mixture was passed in one hour through a catalyst maintained at a temperature between 450° C. and 460° C., said catalyst consisting of silica gel which had been treated as in Example 2. The vapors leaving the catalyst chamber were condensed and the condensate was treated with sodium hydroxide solution, whereby the phenylphenols formed by the hydrolysis dissolved and were thus separated from insoluble unreacted orthochlordiphenyl. The alkaline phenylphenol fraction was acidified with dilute sulfuric acid, thereby liberating 8.8 grams of mixed phenylphenols as an oily layer. The mixed phenylphenols contained about 25 per cent by weight of meta-phenylphenol, the remaining 75 per cent being largely ortho-phenylphenol together with a small proportion of para-phenylphenol.

Example 5

A mixture of 15.5 grams of para-chlordiphenyl and 115.6 grams of water was vaporized and the vapor therefrom was passed in one hour through a catalyst maintained at 525° C., said catalyst consisting of about 160 c. c. of granular silica gel which had been soaked in cadmium chloride solution and then dried. The vapors leaving the catalyst chamber were condensed and the condensate was treated as in Example 4. There was obtained 4.3 grams of a phenylphenol mixture containing 19 per cent by weight of meta-phenylphenol and 81 per cent of para-phenylphenol.

Other meta-hydrocarbon-substituted phenols may be produced by procedure similar to that illustrated in the foregoing examples. For instance, the compounds ortho-bromtoluene, para-ethylchlorbenzene, para-cyclohexylchlorbenzene and ortho-bromdiphenyl may be hydrolyzed in vapor phase with steam to produce meta-cresol, meta-ethylphenol, meta-cyclohexylphenol, and meta-phenylphenol, respectively. My method may also be employed to produce meta-substituted phenols from mixtures of ortho- and para-hydrocarbon-substituted halobenzenes.

In brief, my invention comprises the vapor-phase hydrolysis of a halo-hydrocarbon having the general formula R—$C_6H_4$—X, where R represents an aryl or alkyl group and X a halogen, whereby the halogen of the halo-hydrocarbon is replaced by hydrogen and a hydroxy group replaces a hydrogen in a position ortho or para to that originally occupied by the halogen.

Other modes of applying the principle of my invention may be employed instead of those explained, change being made as regards the details herein disclosed, provided the step or steps stated by any of the following claims or the equivalent thereof be employed.

I therefore particularly point out and distinctly claim as my invention:—

1. The method of making, from a hydrocarbon-substituted halogenated aromatic hydrocarbon, a substituted phenol wherein by rearrangement hydrogen occupies the original halogen position and the hydroxy group occupies another position in the benzene ring, which comprises reacting said halogenated hydrocarbon with steam in the vapor phase and in the presence of a hydrolytic catalyst, and separating such phenol from the reaction product.

2. The method which comprises passing a halogenated aromatic hydrocarbon having the general formula, R—$C_6H_4$—X, wherein R represents a radical selected from the class consisting of aryl and alkyl radicals and X represents a halogen, in the vapor phase together with steam through a hydrolytic catalyst effective in promoting reaction between said halogenated hydrocarbon and steam, whereby a substituted phenol is formed in which hydrogen occupies the original halogen position and the hydroxy group occupies another position in the benzene ring, and separating such phenol from the reaction product.

3. The method of making meta-aryl- and meta-alkyl-substituted phenols which comprises reacting in the vapor phase and in the presence of a hydrolytic catalyst steam and a halogenated aromatic hydrocarbon having the general formula:

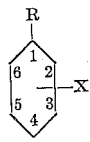

where R is a radical selected from the class consisting of aryl and alkyl radicals and X is a halogen substituent which is in one of the positions 2 and 4, whereby a substituted phenolic compound is formed in which the hydroxy group is in position 3, and separating such phenolic compound from the reaction product.

4. The method of making meta-aryl- and meta-alkyl-substituted phenols which comprises reacting in the vapor phase steam and a halogenated aromatic hydrocarbon having the general formula:

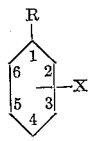

where R is a radical selected from the group consisting of aryl and alkyl radicals and X is a halogen in one of the positions 2 and 4, at a temperature between about 400° C. and about 650° C. and in the presence of hydrolytic catalyst, whereby a substituted phenolic compound is formed in which the hydroxy group is in position 3, and separating such phenolic compound from the reaction product.

5. The method of making meta-cresol which comprises reacting a monohalotoluene having the formula:

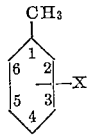

where X is a halogen in one of the positions 2 and 4, in the vapor phase with steam in the presence of a hydrolytic catalyst, and separating meta-cresol from the reaction product.

6. The method of making meta-cresol which comprises reacting a monohalotoluene having the formula:

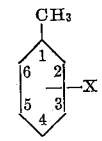

where X is a halogen in one of the positions 2 and 4, in the vapor phase with steam in the presence of a hydrolytic catalyst, at a temperature between about 400° C. and about 650° C., and separating meta-cresol from the reaction product.

7. The method of making meta-phenylphenol which comprises reacting a monohalodiphenyl having the formula:

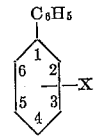

where X is a halogen in one of the positions 2 and 4, in the vapor phase with steam in the presence of a hydrolytic catalyst, and separating meta-phenylphenol from the reaction product.

8. The method of making meta-phenylphenol which comprises reacting a monohalodiphenyl having the formula:

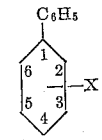

where X is a halogen in one of the positions 2 and 4, in the vapor phase with steam in the presence of a hydrolytic catalyst, at a temperature between about 400° C. and about 650° C., and separating meta-phenylphenol from the reaction product.

EDGAR C. BRITTON.